United States Patent
Kuntz et al.

(10) Patent No.: US 8,932,971 B2
(45) Date of Patent: *Jan. 13, 2015

(54) CERAMIC MATERIAL

(75) Inventors: Meinhard Kuntz, Esslingen (DE); Peter Schröter, Wunsiedel (DE); Wolfgang Jaschinski, Neidlingen (DE); Volker Sommer, Plochingen (DE)

(73) Assignee: CeramTec GmbH, Plochingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/597,555

(22) PCT Filed: Apr. 25, 2008

(86) PCT No.: PCT/EP2008/055055
§ 371 (c)(1),
(2), (4) Date: Oct. 26, 2009

(87) PCT Pub. No.: WO2008/132157
PCT Pub. Date: Nov. 6, 2008

(65) Prior Publication Data
US 2010/0120605 A1 May 13, 2010

(30) Foreign Application Priority Data

Apr. 27, 2007 (DE) .......... 10 2007 020 470

(51) Int. Cl.
*C04B 35/119* (2006.01)
*C04B 35/80* (2006.01)
*C04B 35/645* (2006.01)

(52) U.S. Cl.
CPC ........... *C04B 35/119* (2013.01); *C04B 35/6455* (2013.01); *C04B 2235/3206* (2013.01); *C04B 2235/3213* (2013.01); *C04B 2235/3222* (2013.01); *C04B 2235/3225* (2013.01); *C04B 2235/3232* (2013.01); *C04B 2235/3241* (2013.01); *C04B 2235/612* (2013.01); *C04B 2235/661* (2013.01); *C04B 2235/662* (2013.01); *C04B 2235/77* (2013.01); *C04B 2235/785* (2013.01); *C04B 2235/80* (2013.01); *C04B 2235/96* (2013.01)
USPC ......... 501/105; 501/95.2; 501/95.3; 501/125; 501/127

(58) Field of Classification Search
CPC ................................... C04B 35/803

USPC ........ 501/105, 95.2, 95.3, 125, 127; 89/36.02
See application file for complete search history.

(56) References Cited

U.S. PATENT DOCUMENTS

| | | | | |
|---|---|---|---|---|
| 4,155,124 | A * | 5/1979 | Kawahara et al. | 623/23.56 |
| 4,316,964 | A * | 2/1982 | Lange | 501/105 |
| 4,657,877 | A * | 4/1987 | Becher et al. | 501/89 |
| 5,002,911 | A * | 3/1991 | Matsumoto et al. | 501/105 |
| 5,009,822 | A * | 4/1991 | Sacks et al. | 264/641 |
| 5,389,450 | A * | 2/1995 | Kennedy et al. | 428/552 |
| 5,569,422 | A * | 10/1996 | Astier et al. | 156/89.11 |
| 5,830,816 | A * | 11/1998 | Burger et al. | 501/105 |
| 6,617,013 | B2 * | 9/2003 | Morrison et al. | 428/293.4 |
| 7,148,167 | B2 * | 12/2006 | Shikata et al. | 501/105 |
| 7,300,621 | B2 * | 11/2007 | Merrill | 264/640 |
| 7,820,577 | B2 * | 10/2010 | Shikata et al. | 501/105 |
| 2002/0168505 | A1* | 11/2002 | Morrison et al. | 428/293.1 |
| 2003/0012939 | A1* | 1/2003 | Carper | 428/293.4 |
| 2005/0049137 | A1* | 3/2005 | Shikata et al. | 501/105 |
| 2006/0063661 | A1* | 3/2006 | Cohen | 501/105 |
| 2008/0118722 | A1* | 5/2008 | Shikata et al. | 428/212 |
| 2009/0163346 | A1* | 6/2009 | Cohen | 501/134 |

FOREIGN PATENT DOCUMENTS

| | | | |
|---|---|---|---|
| EP | 1 188 729 | A | 3/2002 |
| EP | 1679089 | * | 7/2006 |
| FR | 2807945 | * | 10/2001 |
| JP | 61117153 | * | 6/1986 |
| JP | 2005 097077 | A | 4/2005 |
| WO | WO 92/02470 | A | 2/1992 |
| WO | 2006080473 | * | 8/2006 |

OTHER PUBLICATIONS

Burger W. :"Zirconia-Toughened and Platelet-Reinforced Alumina-Based Ceramics", *Keramische Zeitschrift*, DVS Verglas, Duesseldorf, DE, 49 (12), (1997), pp. 1067-1070.

Burger W. : "Zirconia-Toughened and Platelet-reinforced Alumina-Based Ceramics (Part 2)", *Keramische Zeitschrift*, DVS Verglas, Duesseldorf, DE, 50 (1), 18, (1998), pp. 20-22.

Schmid, et al. :"The Synthesis of Calcium or Strontium Hexaluminate added ZTA Composite Ceramics", *J. Eur. Ceramic Soc.*, 19, No. 9, (1999) pp. 1741-1746, XP004165942, ISSN: 0955-2219.

* cited by examiner

*Primary Examiner* — Karl Group
(74) *Attorney, Agent, or Firm* — James R. Crawford; Fulbright & Jaworski LLP

(57) ABSTRACT

A material composed of a large fraction of aluminum oxide, zirconium oxide and strontium aluminate.

9 Claims, No Drawings

CERAMIC MATERIAL

This application is a §371 of PCT/EP2008/055055 filed Apr. 25, 2008, and claims priority from DE 10 2007 020 470.3 filed Apr. 27, 2007.

The invention relates to a ceramic material which is particularly suitable for dynamic stresses.

Ceramic materials offer a wide range of possible applications. Their composition can be adapted to their intended use by the targeted addition of specific elements and/or compounds thereof. Aluminum oxide and zirconium oxide, for example, are ceramic materials which, individually or in combination with one another, can be processed into cutting tools, catalyst supports or prostheses.

Ceramic materials are brittle and therefore not generally suitable for dynamic stresses, in particular caused by vibrations and impacts.

The object of the invention is to provide a ceramic material which is suitable for dynamic stresses.

Surprisingly, it has been shown that an aluminum oxide material of the composition listed in the following table in a sintered compact is suitable as a material having the ability to absorb energy under dynamic stress. This material is therefore particularly suitable for use as an armor ceramic, i.e. for the production of components in which energy absorption is necessary, such as e.g. in armor platings and particularly in body armor.

| Material | wt. % | wt. % |
|---|---|---|
| $ZrO_2$ | 18 | 28 |
| $Cr_2O_3$ | 0 | 1 |
| $Y_2O_3$ (relative to $ZrO_2$) | 0 | 6 |
| SrO | 0 | 2 |
| $TiO_2$ | 0 | 0.5 |
| MgO | 0 | 0.5 |

Aluminum oxide to make up to 100 wt. %

The dominant structural component of a material combination of this type is aluminum oxide. The property-determining features, such as hardness, modulus of elasticity and thermal conductivity, are therefore very close to the properties of pure aluminum oxide. The components zirconium oxide and strontium aluminate are embedded in the aluminum oxide matrix. The raw materials are preferably used in high purity. As a result of the high purity of the raw materials, grain-boundary phases are only formed to an extremely small extent. The strontium aluminate forms characteristic plate-like crystallites, platelets, which make a significant contribution to the increase in strength.

The components zirconium oxide and strontium aluminate contribute to the increase in fracture toughness, which is about 60% higher than is the case with pure aluminum oxide. These reinforcing components result in an increase in strength by a factor of almost 2, and at the same time the damage tolerance, i.e. the property of the component to retain high residual strength even with possible damage, also increases.

When a sintered compact made of the material is under high mechanical stress, mechanisms are surprisingly activated which, for example, inhibit or stop crack propagation. The most important mechanism here is the stress-induced conversion of the zirconium oxide from the tetragonal to the monoclinic phase. The volume expansion of the zirconium oxide associated with the conversion causes the formation of local compressive stresses, which counteracts the external tensile load and thus prevents crack growth.

Surprisingly, the crack path is deflected by the embedded platelets, and so additional energy is absorbed during crack propagation.

It may be regarded as a special feature of the material according to the invention that the two mechanisms mutually reinforce one another so that the effective increase in fracture toughness is even greater than would be expected from the simple addition of the individual mechanisms.

A preferred material composition is listed below with its properties:

| Batch, PL specs | $ZrO_2$ wt. % | $Y_2O_3$ wt. % | $Cr_2O_3$ wt. % | SrO wt. % | ED 2000 g/cm³ | 4-point strength MPa | Min. break strength MPa | Weibull modulus | HV10 | mono % | $K_{Ic}$ MPa m$^{0.5}$ | Grain size µm |
|---|---|---|---|---|---|---|---|---|---|---|---|---|
| min | 24.0 | 0.50 | 0.26 | 0.70 | 4.360 ≥ | 1000 ≥ | 700 | 7 ≥ | 1740 ≥ | 10 ≤ | 5.5 ≥ | medium 0.58 |
| max | 25.5 | 0.65 | 0.35 | 0.85 | | | | | | | | |

The $Al_2O_3$ content of 72.65 wt. % to 74.54 wt. % makes up the balance. Impurities due to the raw materials (<0.05 wt. %) are possible, but are not listed separately owing to their small proportion.

The production of sintered moldings from the material according to the invention takes place by conventional ceramics technology. The essential process steps are:

a) Adding the powder mixture to water in the specified composition, using liquifiers to avoid sedimentation.
b) Homogenizing in a high-speed mixer.
c) Grinding in an attrition mill, thus increasing the specific surface area of the powder mixture (=comminution).
d) Adding organic binders.
e) Spray-drying, resulting in free-flowing granules with defined properties.
f) Moistening the granules with water.
g) Pressing axially or isostatically.
h) Green machining, largely forming the final contours taking into account the shrinkage on sintering.
i) Pre-firing, during which shrinkage to approx. 98% of the theoretical density occurs. Any remaining residual pores are closed to the outside.
j) Hot isostatic pressing at high temperature and under high gas pressure, resulting in almost complete final compression.
k) So-called white firing, resulting in equalization of the imbalance of the oxygen ions in the ceramic produced during hot isostatic pressing.
l) Hard machining by grinding and polishing.
m) Annealing.

The properties of the sintered molding made of the material according to the invention can be further reinforced by means of inclusions. Thus, it is possible to mix whiskers and/or fibers into the material before shaping a sintered compact, or to incorporate net-like structures or woven fabrics into the material in the green state. The whiskers, fibers or nets or woven fabrics must be made of a material which does not interact with the ceramic material in a way that would lead to an impairment of its properties. Furthermore, the material must not become modified during sintering in a way that would damage the material.

Sintered moldings produced from the material according to the invention surprisingly combine the best properties of each of the intrinsically competing ceramic materials aluminum oxide and zirconium oxide, particularly for use as an armor ceramic: hardness, ageing resistance, wetting behavior with respect to water and high thermal conductivity are properties known from sintered moldings of aluminum oxide, and high strength and high fracture toughness, i.e. damage tolerance, are properties known from sintered moldings of zirconium oxide.

The invention claimed is:

1. A ceramic material comprising 24.0 to 25.5 wt. % $ZrO_2$, 0.26 to 0.35 wt. % $Cr_2O_3$, 0.50 to 0.6 wt. % $Y_2O_3$, 0.70 to 0.85 wt. % SrO and $Al_2O_3$ to make up to 100 wt. % as an aluminum oxide matrix, wherein the ceramic material is interspersed with at least one member selected from the group consisting of whiskers, fibers and a woven fabric, wherein the ceramic material is sintered, and wherein the sintered ceramic has a 4-point flexural strength of ≥1000 MPa.

2. A ceramic material according to claim 1, wherein the ceramic material is interspersed with the woven fabric.

3. A ceramic material according to claim 1, wherein the ceramic material is interspersed with said whiskers.

4. A ceramic material according to claim 1, wherein the ceramic material is interspersed with said fibers.

5. A ceramic material according to claim 1, wherein the hardness HV10 is ≥1740.

6. A ceramic material according to claim 1, wherein the density ED2000 is ≥4.360 g/cm³.

7. A ceramic material according to claim 1, comprising strontium aluminate in the form of plate-like crystallites.

8. A ceramic material according to claim 1, wherein the fracture toughness $K_{1c}$ is ≥5.5 MPam$^{0.5}$.

9. A ceramic material according to claim 1, wherein the Weibull modulus is ≥7.

* * * * *